United States Patent [19]

Hanson et al.

[11] 3,794,854

[45] Feb. 26, 1974

[54] SIGNAL SENSING AND STORAGE CIRCUIT

[75] Inventors: Richard Eric Hanson, Woburn; Howard Eisen Fineman, Newton Centre, both of Mass.

[73] Assignee: RCA Corporation, Princeton, N.J.

[22] Filed: Nov. 30, 1972

[21] Appl. No.: 310,817

[52] U.S. Cl. .................................... 307/238, 328/69

[51] Int. Cl. .................................... H03k 5/00

[58] Field of Search ...... 307/215, 218, 238; 328/58, 328/69, 63, 71

[56] References Cited

UNITED STATES PATENTS

| | | | |
|---|---|---|---|
| 3,244,985 | 4/1966 | Turecki | 307/215 |
| 3,339,157 | 8/1967 | Fiorino | 307/215 |
| 3,471,789 | 10/1969 | Nutting | 307/215 |
| 3,510,683 | 5/1970 | Rotier | 307/218 |
| 3,145,309 | 8/1964 | Bothwell | 307/215 |
| 3,467,839 | 9/1969 | Miller | 307/215 |
| 2,985,773 | 5/1961 | Dobbie | 307/215 |
| 3,430,148 | 2/1969 | Miki | 307/215 |
| 3,264,567 | 8/1966 | Prieto | 307/215 |
| 3,571,729 | 3/1971 | Honma | 328/92 |
| 3,693,102 | 9/1972 | Harf | 328/92 |

*Primary Examiner*—Rudolph V. Rolinec
*Assistant Examiner*—R. E. Hart
*Attorney, Agent, or Firm*—H. Christoffersen; Samuel Cohen

[57] ABSTRACT

Circuit for distinguishing signals of relatively long duration (information) on a plurality of input lines from one or more signals of relatively short duration (noise) on these same lines. Any signal present on a line enables a gate for that line which is normally maintained in a primed state by a storage element connected to that line. The enabled gate causes a circuit which is common to all lines to produce a delayed pulse. If, when the delayed pulse occurs, a normally primed gate for a line is still enabled, the storage element of that line is set and the latter disables that gate. If, on the other hand, the normally primed gate is not enabled when the delayed pulse occurs, the storage element is not disturbed and the gate is retained in its primed condition.

7 Claims, 7 Drawing Figures

SIGNAL SENSING AND STORAGE CIRCUIT

STATEMENT

The invention described herein was made in the course of or under a contract or subcontract thereunder with the Department of the Army.

BACKGROUND OF THE INVENTION

There are many applications in which signals of greater than a given duration must be distinguished from noise. For example, in the field of automatic testing, the relatively long duration information signals indicative of various parameters of a unit under test may be preceded by high amplitude noise signals generated during the test procedure. It is necessary to discriminate against the noise signals and to sense and store the information signals to enable the latter to be processed.

SUMMARY OF THE INVENTION

An input line connects to one terminal of a gate. A storage element connects to another terminal of the gate and normally maintains the gate in a primed condition. In response to an input signal, the gate becomes enabled, causing a pulse circuit to produce a delayed pulse. There may be many input lines, gates and storage elements and the pulse circuit may be common to all of them. If, when the delayed pulse is produced an input signal is still present maintaining a gate enabled, the state of the storage element associated with that gate is changed and the storage element thereupon disables the gate.

DETAILED DESCRIPTION

Figure 1:
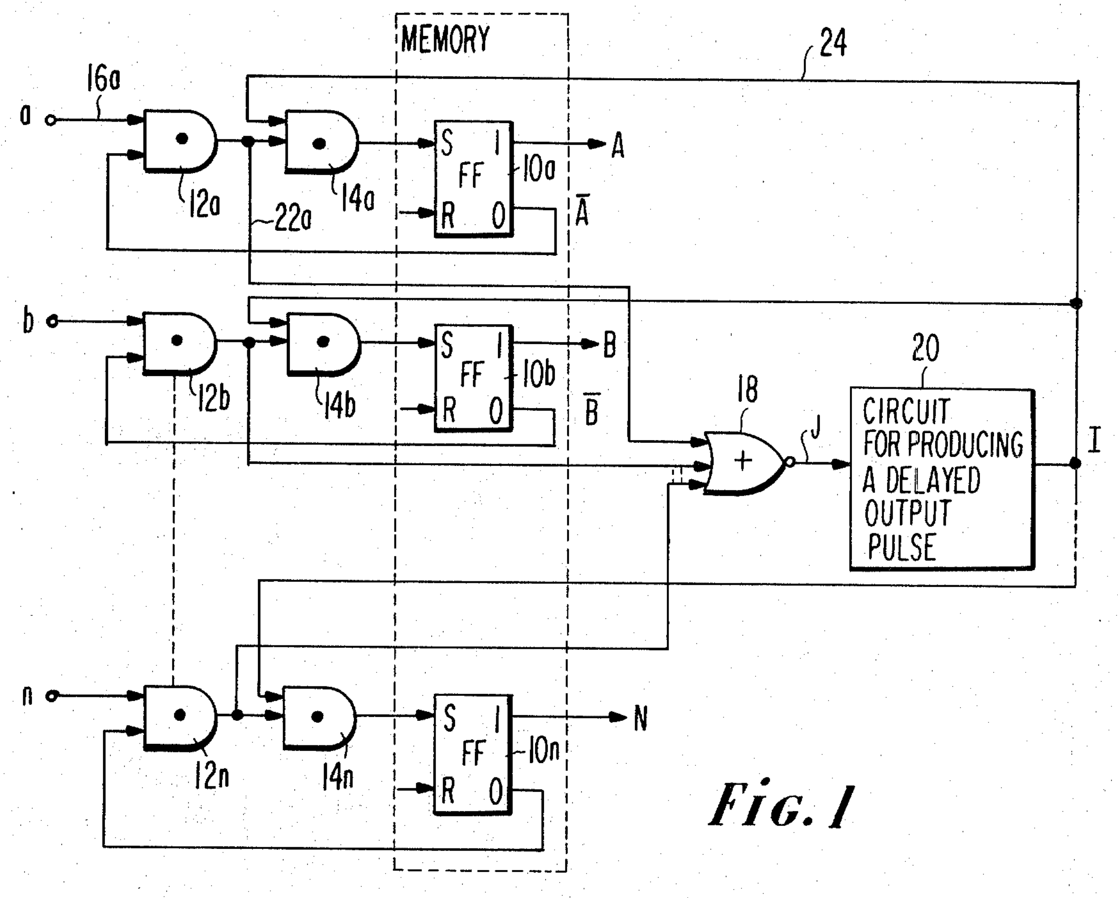
FIG. 1 is a block diagram of one embodiment of the invention.

The system of FIG. 1 includes a memory having *n* stages. Each of the stages is a set-reset flip-flop and only three of the stages 10*a*, 10*b* and 10*n* are illustrated. The noise discrimination circuit for each stage is the same and only the one for stage 10*a* will be discussed in detail. It includes a first AND gate 12*a* connected at its output terminal to an input terminal of AND gate 14*a*. An input signal line 16*a* to which the signal *a* is applied connects to one input terminal of AND gate 12*a*. The 0 output terminal of flip-flop 10*a* connects to the second input terminal of AND gate 12*a*.

Figure 3:
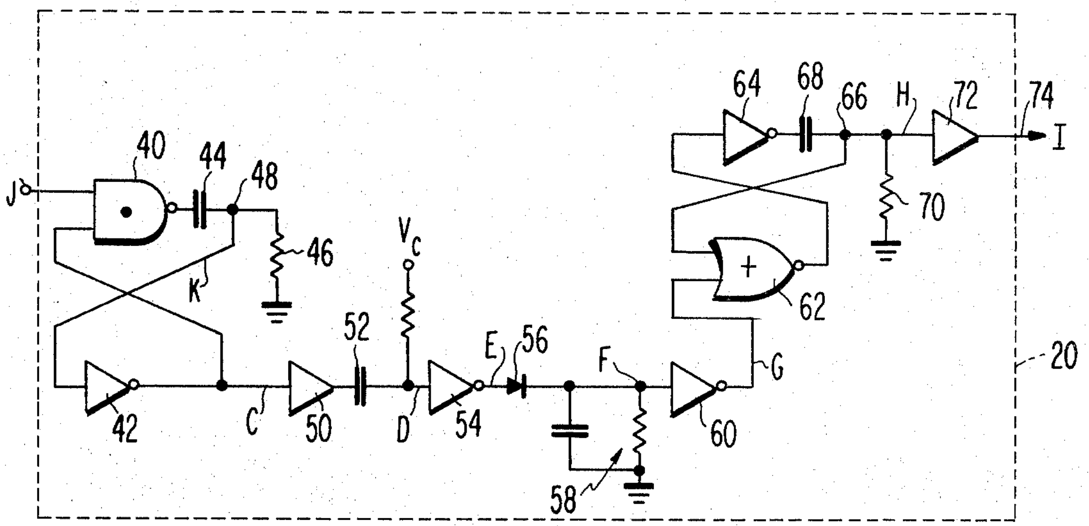
FIG. 3 is a logic diagram showing the details of circuit 20 of FIG. 1.

The output terminal of gate 12*a* also connects to a circuit which is common to the entire system. This circuit includes NOR gate 18 and a circuit 20 for producing a delayed output pulse. This circuit is shown in FIG. 3 and its detailed operation is discussed later. In brief, circuit 20 produces a short duration enabling pulse I an interval ΔT after the last occurring of a group of relatively closely spaced noise pulses at NOR gate 18, or an interval ΔT after a change in the direct current level signal from a "low" to a "high" at NOR gate 18. The output enabling pulse I produced by circuit 20 is applied to gates 14*a*, 14*b* - - - 14*n*.

In the operation of the system of FIG. 1, assume first an input signal such as *a* is a relatively long signal—a "high" direct current level representing a binary 1. Flip-flop 10*a* initially is reset so that its 0 output terminal carries a relatively high level representing a 1. This normally primes AND gate 12*a* so that when *a* changes from 0 to 1, gate 12*a* becomes enabled. The 1 signal produced by gate 12*a* is applied via lead 22*a* to NOR gate 18 causing the latter to produce a low output signal J representing a 0. The change in J from 1 to 0 serves as a triggering signal for circuit 20 and in the absence of further change in the value of J for a given interval of time ΔT, circuit 20 produces an enabling pulse I after that interval ΔT. In one practical application having to do with the automatic testing of vehicle engines in the presence of ignition noise, ΔT was chosen to be one second but, of course, other values greater or less than one second may be chosen for this or other applications.

The pulse I produced by circuit 20 is applied via lead 24 to the second input terminal to AND gate 14*a*. In the present example, as the pulse *a* is a relatively long pulse (longer than one second) gate 12*a* is still enabled when the pulse I occurs. Accordingly, AND gate 14*a* becomes enabled and sets flip-flop 10*a*. The signal present at the 0 output terminal of this flip-flop now changes to a low level representing a 0 and this disables AND gate 12*a*. Accordingly, input line 16*a* is effectively disconnected from NOR gate 18 and circuit 20.

Assume now that the pulse *a* is a single, short duration noise spike. This still enables AND gate 12a and the latter causes NOR gate 18 to apply a triggering signal to pulse circuit 20. However, circuit 20 does not produce the enabling signal I until the delay interval ΔT=1 second has expired. By this time the noise signal at *a* has disappeared so that AND gate 12*a* is disabled and is applying a 0 to AND gate 14*a*. Therefore the I=1 signal does not enable AND gate 14*a*, and flip-flop 10*a* remains in its reset condition. Thus, the circuit has effectively discriminated against a noise pulse, that is, it has not mistaken noise for information and the memory stage 10*a* has not changed its state.

An important feature of the circuit described above is that the circuit 18, 20 is common to the entire system. The AND gates 12 isolate the input lines from this circuit after an information signal has been received and stored. When this occurs at a memory element, its gate 12 becomes disabled so that even if the signal at its input line should change, the gate 12 can no longer cause the pulse circuit 20 to be triggered. The memory may be cleared, when desired, by applying a reset signal to the reset terminal R of the flip-flops 10.

Figure 2:
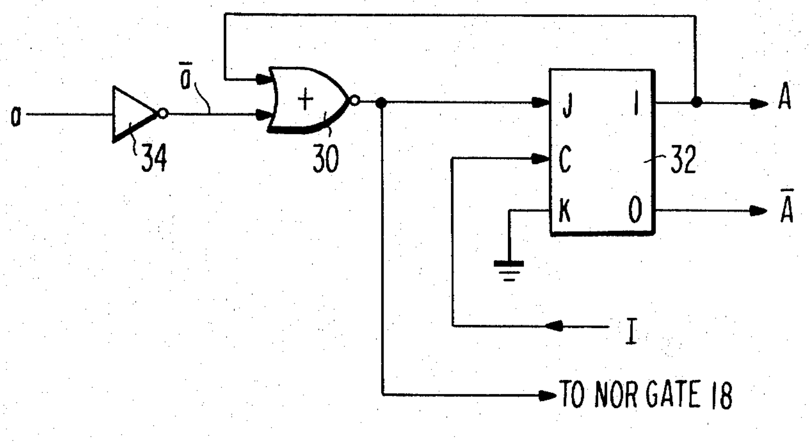
FIG. 2 is a block diagram of another embodiment of the invention.

FIG. 2 shows a portion of the circuit of FIG. 1 in modified form. The gate 12 of FIG. 1 is replaced by a single NOR gate 30. The set-reset flip-flop 10 and the gate 14 of FIG. 1 are replaced by a JK flip-flop 32. The signal $\bar{a}$ required to activate the circuit is now a low representing a 0 and this is indicated symbolically by the inverter 34 in series with one input lead to NOR gate 30. The remaining stages *b–n* of the system are similar to stage *a* and are not illustrated.

In the operation of the circuit of FIG. 2, JK flip-flop 32 initially is reset so that A=0. This signal primes NOR gate 30. When *a* goes high indicative either of a latching signal or a noise signal, inverter 34 applies a low to NOR gate 30 enabling the latter, and the NOR gate produces a high signal representing a 1 which is transmitted to NOR gate 18. After the delay interval ΔT, circuit 20 produces an I=1 enabling pulse which it applies to the clock terminal C of JK flip-flop 32. If the input signal *a* represents information and is still present, it is clocked into the flip-flop causing it to become set and as A changes to 1, NOR gate 30 is disabled. On the other hand, if the input signal *a* was noise — a short duration pulse, by the time the enabling signal I is produced, *a* has changed to 0. The inverter 34 therefore disables NOR gate 30 causing it to produce a low or 0 output. This 0 is clocked into the JK flip-flop: however, as the latter already is in its reset condition, this has no effect on the flip-flop state.

The circuit of FIG. 2 also can operate when the return signal is G (discussed in connection with FIG. 3) rather than I, provided by JK flip-flop is triggered on the positive going edge of the clock signal. The use of G rather than I simplifies the circuit 20.

The circuit 20 shown in FIG. 3 includes a NAND gate 40 and an inverter 42 interconnected as a monostable circuit. The NAND gate 40 output terminal is connected via capacitor 44 and resistor 46 to ground. The node 48 between the capacitor and the resistor is connected to the input terminal of inverter 42 and the output terminal of the inverter connects back to the second input terminal to NAND gate 40.

The output terminal of inverter 42 also connects to amplifier 50. The latter is coupled through capacitor 52 to the input terminal of inverter 54. Inverter 54 connects through diode 56 to integrating circuit 58 and to the input terminal of inverter 60.

The inverter 60 connects to NOR gate 62 which is cross coupled to inverter 64. The connection from the inverter 64 to the second input terminal of the NOR gate 62 is from the node 66 between capacitor 68 and resistor 70. This circuit 62, 64, 68, 70 is a monostable circuit and it is connected to output line 74 through amplifier 72.

Figure 4:
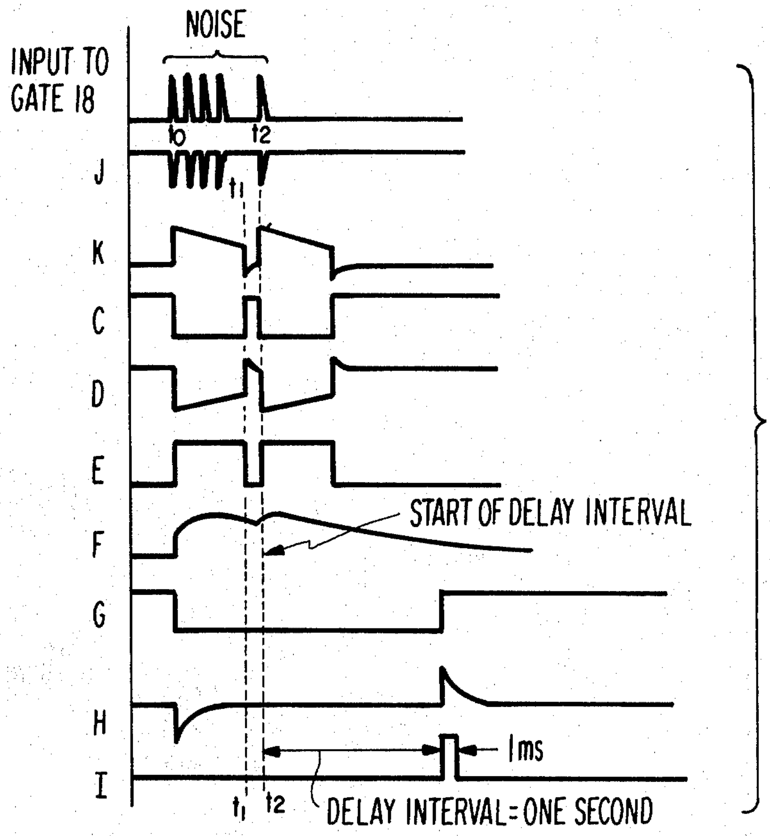
FIGS. 4 and 5 are drawings of waveforms to help explain the operation of the circuits of FIGS. 1–3.

As mentioned briefly above, the circuit 20 of FIG. 3 produces an output enabling pulse I 1 second after the last occurring of a group of closely spaced noise pulses, or one second after the leading edge of an information signal. The operation in response to five relatively closely spaced noise pulses (spaced closer than 1 second apart) is depicted in FIG. 4. The signal C normally represents a 1. When the input line is noise free, all inputs to NOR gate 18 normally are low so that J is normally high representing a 1. At time $t_0$ when the first noise spike occurs, J goes negative. This negative-going J pulse triggers NAND gate 40. Both J and C initially were high and at time $t_0$ when J goes low, K goes high. The capacitor-resistor circuit 44, 46 performs a differentiating function and causes K to remain high for a relatively long interval of time. Accordingly, C remains low for a corresponding interval of time. The second, third and fourth noise pulses, which follow closely after the first noise pulse, have no effect on the circuit as K remains high. At time $t_1$ K drops to a sufficiently low level that the monostable circuit 40, 42 reverts to its original or stable state, that is, K goes low and C goes high.

The signal D is an AC amplified version of the signal. When C and D go high at time $t_1$, E goes low. However, the integrating circuit 58 maintains F at a relatively high level so that G, which was low, remains low.

In the present example at time $t_2$, which is a short time after $t_1$, a fifth noise pulse occurs. The effect of this pulse is again to change the state of circuit 40, 42. K goes high again and C goes low. This causes E again to go high and F, which was somewhat lowered in amplitude as a result of the negative going pulse at E, is returned to its initial relatively high value.

In the example of FIG. 4 no further noise pulse occurs after time $t_2$. Therefore, K goes low and C goes high a fixed time after $t_2$. When C goes high, E goes low, whereupon the capacitor of circuit 58 slowly discharges through the resistor of this circuit until the voltage at F reduces to a sufficiently low value that inverter 60 produces a high output. The time (measured from $t_2$) required for the capacitor 52 to charge and then for the capacitor of network 58 to discharge to the switching levels of inverters 54 and 60, respectively, is the delay interval ΔT, which in the present example is chosen to be one second. When G changes to 1, the state of circuit 62, 64 changes. H, the voltage present at node 66, goes positive and the amplifier 72 produces a high output.

The duration of the pulse I is determined by the time the constant of differentiating circuit 68, 70. When the voltage across resistor 70 reduces to a sufficiently low value, the circuit 62, 64 returns to its original stable state and the enabling pulse I terminates. The time constants may be chosen to produce an enabling pulse I having a duration of say a millisecond or so. This pulse should be relatively short so that gates 14 (FIG. 1) are primed for only a short time and there is less chance of noise passing through any gate and setting its flip-flop.

Summarizing the operation above, for the example of FIG. 4 where there are five relatively closely spaced pulses, the circuit produces an output pulse I 1 second after the last occurring of these pulses. It is clear that if there is only a single noise pulse as in the example discussed previously in connection with the operation of the circuit of FIG. 1, then the pulse I would be produced one second after this single noise pulse.

Figure 5:
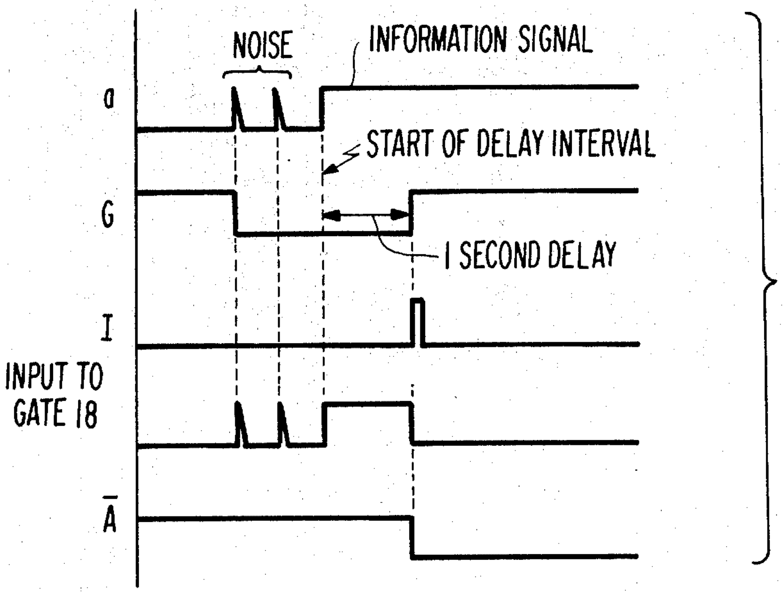

FIG. 5 illustrates the operation of the circuit of FIG. 3 for the case in which two noise pulses are followed by an information signal. The noise pulses are assumed to be spaced one-half second apart and the information signal starts one-half second from the last noise pulse. As is clear from FIG. 5, the enabling pulse I is produced one second after the start of the information signal. The circuit of FIG. 3 essentially suppresses the two noise pulses.

In the case in which there is an information signal not proceeded by any noise pulses then, of course, the enabling signal I starts at interval ΔT, equal to 1 second, after the start of the information signal.

Figure 6:
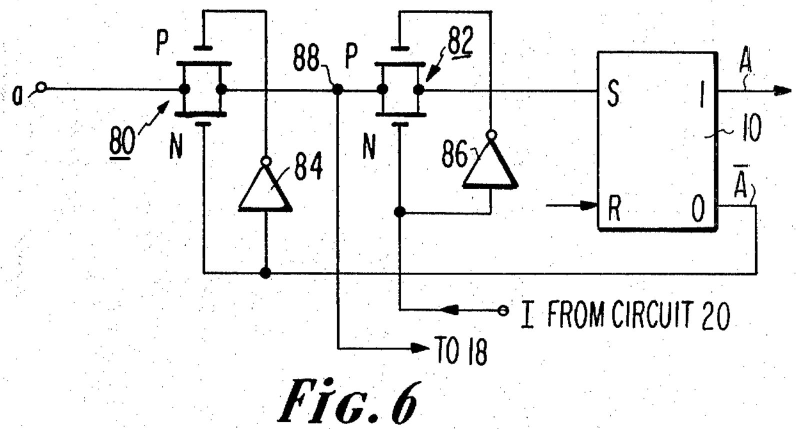
FIGS. 6 and 7 show modifications of the system of FIGS. 1–3.

The FIG. 6 circuit is an embodiment of the circuit of FIG. 1. Again only one of the memory elements and its associated components are shown. The AND gates are implemented by complementary symmetry metal oxide semiconductor (COS/MOS) transmission gates 80 and 82. These gates plus the inverters 84 and 86 and also the flip-flop may all be integrated circuits.

As in the FIG. 1 circuit, the AND gate 80 initially is primed by the high $\overline{A}$ signal which is applied to the gate electrode of the N type transmission gate and by the complementary signal produced by inverter 84 which is applied to the gate electrode of the P type transmission gate. Transmission gate 82 normally is disabled by the low applied to the gate electrode of the N type transistor gate 82 and by the high applied to the gate electrode of the P type transistor by inverter 86. In the case in which *a* is an information signal, one second after *a* goes high, the I=1 enabling pulse is produced by circuit 20 and this enables transmission gate 82. The latter then applies the high present at node 88 to the set terminal S of flip-flop 10 setting the flip-flop. This causes $\overline{A}$ to go low which disables transmission gate 80. In the case in which *a* is a noise pulse, by the time pulse I is produced, *a*=0 so that the flip-flop remains reset.

Figure 7:
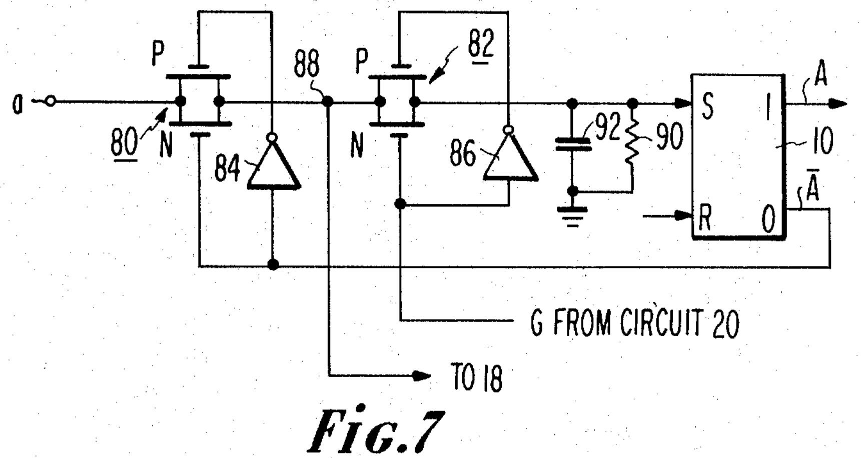

A second form of the circuit of FIG. 6 is shown in FIG. 7. It includes the same circuit elements as the FIG. 6 circuit and, in addition, it includes a filter consisting of resistor 90 and capacitor 92. In this circuit, the G signal from circuit 20 is employed rather than the I signal.

Transmission gate 80 normally is primed by the $\overline{A}$ signal. Transmission gate 82 normally is primed by the high G signal. When the input signal *a* goes high, G goes low as is clear from FIG. 4. This disables transmission gate 82. The filter 90, 92 prevents the momentary transient which occurs when *a* goes high from setting the flip-flop 10.

After the initial operation described above, the circuit of FIG. 7 functions in the same way as the previous circuits. Assuming the *a* signal is an information signal, after the delay interval ΔT, G goes high enabling the dual transmission gate 82 and causing the flip-flop to be set. Assuming the *a* signal is a noise pulse which has disappeared by the time the G signal goes high, then the flip-flop 10 does not become set. In this case, when G goes high, *a* is low and the signal at node 88 is low so that even though the dual transmission gate 82 is in its low impedance condition, no set signal is available for the flip-flop.

What is claimed is:

1. In combination:

a plurality of circuits, each including:

a. a two state storage means;

b. logic gate means normally primed by the storage means; and c. a signal input line coupled to an input terminal of said logic gate means for enabling the latter in response to a signal on said line:

pulse producing means common to said plurality of circuits coupled to the output terminal of all of said logic gate means for producing a delayed output pulse in response to a signal from any logic gate means; and means responsive to the presence of a signal on an input line at the time a delayed pulse is produced by said pulse producing means for changing the state of the storage means associated with that input line, thereby disabling the logic gate means to which said input line is coupled.

2. In the combination as set forth in claim 1, said pulse producing means comprising means for producing a pulse delayed an interval ΔT after the last occurring of a group of successive signals spaced intervals less than ΔT from one another.

3. In the combination as set forth in claim 1, said last-named means comprising, in each circuit, second logic gate means receptive both of the delayed pulse and of the output signal produced by the first mentioned gate means of that circuit.

4. In the combination as set forth in claim 1, said logic gate means comprising metal-oxide semiconductor transmission gate means.

5. In the combination as set forth in claim 1, said storage means comprising a set-reset flip-flop.

6. In the combination as set forth in claim 1, said storage circuit comprising a JK flip-flop.

7. In the combination as set forth in claim 6, said means responsive to the presence of a signal on the input line comprising one of the J and K terminals of said flip-flop and said delayed pulse being applied to the clock terminal of said flip-flop.

* * * * *